United States Patent
Reinhold et al.

(10) Patent No.: US 8,556,617 B2
(45) Date of Patent: Oct. 15, 2013

(54) DEVICE FOR USE IN THE MANUFACTURE OF FIBER-REINFORCED COMPONENTS

(75) Inventors: Raphael Reinhold, Wittmund (DE); Stefan Juergens, Oldenburg (DE)

(73) Assignee: Broetje Automation GmbH, Wiefelstede (DE)

( * ) Notice: Subject to any disclaimer, the term of this patent is extended or adjusted under 35 U.S.C. 154(b) by 57 days.

(21) Appl. No.: 12/498,515

(22) Filed: Jul. 7, 2009

(65) Prior Publication Data

US 2010/0007065 A1 Jan. 14, 2010

(30) Foreign Application Priority Data

Jul. 11, 2008 (DE) .................... 10 2008 032 574

(51) Int. Cl.
*B29C 51/36* (2006.01)
*B29C 51/40* (2006.01)

(52) U.S. Cl.
USPC ........... 425/388; 425/389; 425/397; 425/504; 425/517; 425/125; 156/232; 156/245; 156/285; 156/286

(58) Field of Classification Search
CPC .... B29C 51/262; B29C 51/36; B29C 51/365; B29C 70/38; B29C 70/44
USPC ............... 425/388, 389, 390, 384, 400, 403, 425/403.1, 405.1, 405.2, 415, 468, 503, 425/504, 546, 121, 122, 125, 126.1, 425/DIG. 10, DIG. 60, 111, 112, 387.1, 398; 156/230, 231, 232, 242, 245, 285, 286, 156/382, 475
See application file for complete search history.

(56) References Cited

U.S. PATENT DOCUMENTS

| | | | | | |
|---|---|---|---|---|---|
| 2,392,108 | A | * | 1/1946 | Vidal et al. | 249/65 |
| 3,146,143 | A | * | 8/1964 | Bolesky et al. | 156/212 |
| 3,561,057 | A | * | 2/1971 | Butzko | 425/214 |
| 3,669,594 | A | * | 6/1972 | Brown et al. | 425/186 |
| 3,785,762 | A | * | 1/1974 | Butzko | 425/289 |
| 3,837,782 | A | * | 9/1974 | Meissner et al. | 425/347 |
| 4,043,736 | A | * | 8/1977 | Andres et al. | 425/397 |
| 4,157,884 | A | * | 6/1979 | Andrae | 425/173 |
| 4,280,804 | A | * | 7/1981 | Holland | 425/388 |
| 4,299,552 | A | * | 11/1981 | Previati | 425/371 |
| 4,334,850 | A | * | 6/1982 | Garabedian | 425/388 |
| 4,368,022 | A | * | 1/1983 | Orii | 425/343 |
| 4,368,024 | A | * | 1/1983 | Asano | 425/397 |
| 4,443,401 | A | * | 4/1984 | Turner | 264/544 |
| 4,462,786 | A | * | 7/1984 | Perryman | 425/388 |
| 4,475,976 | A | | 10/1984 | Mittelstadt et al. | |
| 4,668,524 | A | * | 5/1987 | Kirkpatrick | 426/502 |
| 4,758,145 | A | * | 7/1988 | Hautemont | 425/143 |
| 4,836,765 | A | * | 6/1989 | Kornitzky et al. | 425/388 |

(Continued)

FOREIGN PATENT DOCUMENTS

| | | |
|---|---|---|
| DE | 694 29 118 | 3/2002 |
| DE | 100 42 471 | 4/2002 |
| DE | 101 52 232 | 5/2003 |
| DE | 10 2006 046 624 | 4/2008 |

*Primary Examiner* — Seyed Masoud Malekzadeh
(74) *Attorney, Agent, or Firm* — Michael J. Striker

(57) ABSTRACT

For manufacture of fiber-reinforced components, a positionable base frame is used on which a controllable holding device is provided for gripping and holding at least one reinforced fiber layer. A draping device is provided on the base frame, using which the reinforced fiber layer may be draped onto a mold core via the application of a vacuum.

14 Claims, 4 Drawing Sheets

(56) References Cited

U.S. PATENT DOCUMENTS

| | | | |
|---|---|---|---|
| 4,886,442 A * | 12/1989 | McCowin et al. | 425/388 |
| 4,904,430 A * | 2/1990 | Yamada | 264/102 |
| 5,451,157 A * | 9/1995 | Gimenez | 425/302.1 |
| 5,460,497 A * | 10/1995 | Vismara | 425/4 R |
| 5,464,341 A * | 11/1995 | Tachibana et al. | 425/388 |
| 5,578,158 A * | 11/1996 | Gutowski et al. | 156/285 |
| 5,788,999 A * | 8/1998 | Mizuno et al. | 425/302.1 |
| 5,800,846 A * | 9/1998 | Hart | 425/504 |
| 5,820,983 A * | 10/1998 | Curtin | 425/388 |
| 5,863,568 A * | 1/1999 | Tomita et al. | 425/185 |
| 5,945,137 A * | 8/1999 | Mizuno et al. | 425/302.1 |
| 5,980,231 A * | 11/1999 | Arends et al. | 425/397 |
| 6,224,366 B1 * | 5/2001 | De Nichilo | 425/384 |
| 6,454,557 B1 * | 9/2002 | Chun et al. | 425/397 |
| 7,090,485 B2 * | 8/2006 | Bibeau | 425/388 |
| 7,326,044 B2 * | 2/2008 | Kirchner | 425/387.1 |
| 2008/0080962 A1 | 4/2008 | Holtmeier | |

* cited by examiner

DEVICE FOR USE IN THE MANUFACTURE OF FIBER-REINFORCED COMPONENTS

CROSS-REFERENCE TO RELATED APPLICATION

The invention described and claimed hereinbelow is also described in German Patent Application DE 10 2008 032 574.0 filed on Jul. 11, 2008. This German Patent Application, whose subject matter is incorporated here by reference, provides the basis for a claim of priority of invention under 35 U.S.C. 119(a)-(d).

BACKGROUND OF THE INVENTION

The present invention relates to a device and a method in particular for use in the manufacture of fiber-reinforced components.

Components made of composite fiber materials are being used to an increasing extent in diverse technical areas, such as in machinery, systems, and in the manufacture of vehicles, since components of this type have weight advantages in particular. Fiber-reinforced components may contain carbon fibers, glass fibers, or other known reinforcing materials as the reinforcing material, which are wound as rovings or fiber bundles around appropriate cores, or which are draped in the form of fiber strands or, in particular, fibrous woven fabric mats, onto appropriately shaped mould cores in order to manufacture the desired component shape.

It is possible to use "prepregs" or dry fiber woven fabrics which are subsequently coated or filled with a resin which is used as a matrix material. For example, a mould may be closed and a vacuum may then be applied to the mould, thereby suctioning liquid resin into the interior of the mould, where it saturates the fibrous woven mats present there, so that, after hardening, the desired component which is composed of a fiber-reinforced plastic is available. Duroplastic and thermoplastic materials, for example, are suitable for use as matrix materials.

The disadvantage of the known devices and methods for manufacturing fiber-reinforced components is the amount of manual effort that is required since the fiber layers often must be applied to the mould individually by hand.

DE 10 2006 046 624 A1 made known a device and a method for transporting objects, such as limp components in particular such as carbon fiber mats or the like, in the case of which several carbon fiber mats are gripped in succession in a form-appropriate manner and transported to a mould core, onto which they are placed.

This known state of the art simplifies the manufacture of fiber-reinforced components since the individual fibrous woven fabric layers are transported automatically. Despite the fact that the individual fibrous woven fabric layers are placed automatically, a large number of manual steps is still required to manufacture fiber-reinforced components.

SUMMARY OF THE INVENTION

The object of the present invention, therefore, is to provide an improved device and an improved method for use in the manufacture of fiber-reinforced components, which reduce the amount of manual effort required in the manufacturing process.

In keeping with these objects and with others which will become apparent hereinafter, one feature of the present invention resides, briefly stated in a device for manufacturing fiber-reinforced components, comprising a positionable base frame; a controllable holding device provided on the positionable base frame and configured for gripping and holding at least one reinforced fiber layer; and a draping device provided on said base frame and configured so that with said draping device the reinforced fiber layer is draped onto a mould core via an application of a vacuum.

Another feature of the present invention, resides, briefly stated, in a method of manufacturing fiber-reinforced components, comprising the steps of using a positionable base frame; providing on the positionable base frame a controllable holding device; gripping and holding at least one reinforced fiber layer by the controllable holding device provided on the base frame; draping the reinforced fiber layer onto a mould core via an application of a vacuum with a use of the draping device provided on the base frame.

The device according to the present invention for use in the manufacture of fiber-reinforced components includes at least one positionable base frame on which a controllable holding device is provided for gripping and holding at least one reinforced fiber layer. Moreover, a draping device is provided on the base frame, using which the reinforced fiber layer may be draped onto a mould core via the application of a vacuum. In a simple embodiment of the present invention, the device is designed as a base frame. It is also possible for the device to include components in addition to the base frame.

The device according to the present invention has several advantages. A considerable advantage of the device according to the present invention for use in the manufacture of fiber-reinforced components is that it enables easy transport of fiber-reinforced layers, and that the fiber-reinforced layers may also be draped directly onto a mould core. A considerable amount of manual work is spared as a result.

A further considerable advantage of the device according to the present invention is that the fiber-reinforced layer is draped onto the mould core via the application of a vacuum. As a result, highly diverse shapes may be draped, regardless of the shape of the holding device or the shape of the base frame. By applying a vacuum between the draping device and the mould core, the reinforced-fiber layers are draped tightly onto a mould core having any shape. As a result, it is also possible to manufacture components in the case of which undercuts may form on the mould core. Disposable mould cores or multiple-component mould cores may also be used.

The base frame may be designed as a support frame on which the other components are held or supported.

Preferably, the controllable holding device is adjustable relative to the base frame, and it is height-adjustable in particular. As a result it is possible to move the holding device relative to the base frame between a base position and a holding position. In particular, when the holding device is in the holding position, it extends downwardly past the base frame, while, when the holding device is in the base position, it is preferably situated within the confines of the base frame.

Using the height-adjustable holding device, it is possible, e.g. to position the base frame closely over a fiber-reinforced layer to be gripped; the holding device is then moved relative to the base frame in order to pick up the fiber-reinforced layer and hold it, thereby enabling it to be transported, e.g. to a mould core.

In a preferred development of the present invention, the controllable holding device includes a plurality of suction devices and/or gripping devices which may be activated separately, at least in groups. It is also possible for all or essentially all of the suction and gripping devices to be activatable separately. A considerable advantage of suction devices and/or gripping devices that may be activated individually or in groups is that this enables sections of fiber-reinforced layers which have been cut into nearly any shape to be gripped, while the regions surrounding the blank to be used are not gripped, since the suction devices or gripping devices located there are not activated. As a result, it is possible to use blanks having highly flexible designs.

Needle grippers may be used as the gripping device, for example, in the case of which needles are placed diagonally on the fiber-reinforced layer to be gripped, so that the needles penetrate the fiber-reinforced layer at an angle, thereby resulting in a reliable hold of a fiber-reinforced layer on the needle gripper.

As an alternative to the needle gripper, it is possible to use a freezing gripper, in the case of which a Peltier element is provided in order to freeze a water droplet. If the water droplet is located on the boundary surface between the fiber-reinforced layer and the freezing gripper, then, when the water droplet freezes, the fiber-reinforced layer bears fixedly against the freezing gripper. The connection may be released via a subsequent thawing process which may be supported, e.g. using an appropriate heating element.

Particularly preferably, suction devices are used, in the case of which flat suction boxes having a sealing lip are used in particular in order to grip or suction up the fiber-reinforced layer. Particularly preferably the flat suction boxes include a bellows or the like. Better damping and compensation of position are made possible as a result. For example, it is possible to reliably grip fiber-reinforced layers that are oriented at a 15° angle to the perpendicular.

To generate the necessary vacuum, a plurality of vacuum pumps is used in particular, the individual vacuum pumps preferably being operated using compressed air, and the vacuum being generated via the Bernoulli effect. A considerable advantage of vacuum pumps of this type is that the vacuum is generated in proximity, thereby preventing losses of vacuum due to long supply lines. In addition, compressed air is usually available on-site in industrial settings, thereby reducing the requirements on the electrical connections. Moreover, the use of vacuum generators of this type is also very advantageous since vacuum pumps that are operated using compressed air are quieter than classical vacuum pumps. It is also possible to adjust the vacuum that is required easily and in an individualized manner, while conventional vacuum generators often must be frequency-regulated, for example, in order to regulate the output; the technical and financial outlay is increased as a result. In the case of conventional vacuum generators, expensive housings are often used for damping purposes in order to also dampen noise.

In preferred developments of all of the embodiments described above, the draping device includes at least one stretchable draping layer which is provided in a manner such that it is movable between at least one stationary position and at least one working position. Particularly preferably, the stretchable draping layer is situated in a working position on the underside of the support frame, while the stretchable draping layer at least partially exposes the underside of the support frame when in a stationary position.

Particularly preferably, the stretchable draping layer is designed as a draping membrane that may be rolled up. In the stationary position, the draping membrane or draping layer is rolled up and therefore occupies little space. The stretchability of the stretchable draping layer is preferably high, and may be 100%, 200%, 400% or even 800%. The extent of the stretchability is dependent on the material used for the draping membrane and on the intended use.

In preferred embodiments, the draping membrane is made of silicone or a silicone-containing material, thereby making it possible, in particular, to attain high stretchabilities of between 200% and 600%, and, particularly preferably, stretchabilities of approximately 400%.

A stretchable draping layer makes it possible to drape fiber-reinforced layers on a mould core in a flexible manner. The draping may be attained, e.g. simply by lowering the base frame onto the mould core so that the stretchable draping layer may conform to the mould core. Via the application of a vacuum it is possible to lay down the entire stretchable draping layer or draping membrane which is capable of being rolled up, thereby suctioning the draping membrane onto the mould core and covering it entirely.

Preferably a vacuum channel and/or vacuum bores are provided on the underside of the base frame in order to fix the draping layer in position. When the draping layer is moved to the working position on the underside of the base frame or support frame, a vacuum may be applied to the vacuum channel or the vacuum bores in order to fix the draping layer in position on the underside of the base frame, so that the stretchable draping layer stretches accordingly when it is lowered onto a mould core and adapts to the shape of the mould core.

In advantageous developments, a mould table is provided, which includes a working surface in which holes are distributed in particular. In particular, an evacuation region is provided in the mould table below the working surface, it being possible to apply a vacuum to the evacuation region so that the evacuation holes in the working surface suction out the air that is present in the evacuation region, thereby drawing the fiber-reinforced layer onto the mould core. Optionally, the working surface in the vicinity of the mould core may also be used as a shaping surface. In that case, the fiber-reinforced layers in the vicinity of the mould core may be suctioned via the holes or evacuation holes onto the working surface so that they form an edge there which is removed entirely or partially, for example, after the component has been manufactured.

In particularly preferred embodiments and developments of the present invention, at least one mould core is provided, which is hollow in design in particular so that vacuum may be applied to the interior of the mould core; holes or slots are provided on at least one top side or side of the mould core in order to transfer the vacuum which is present inside or below the mould core to the top side or lateral surfaces of the mould core. The use of hollow mould cores or mould cores which include evacuation bores or channels is particularly advantageous since this enables the vacuum that is applied in the evacuation region of the mould table to be directed to the mould core and the spaces that are located above the mould core.

In the case of a draping device that may be lowered onto the mould core, in which the evacuation region may be evacuated and holes or slots are provided in the top side of the hollow mould core, a draping layer situated above the mould core is suctioned onto the mould core via the vacuum, thereby resulting in an automatic draping of the fiber-reinforced layers. The draping may be enhanced in particular by lowering the draping device with the draping layer onto the mould core, and then suctioning the stretchable draping layer onto the mould core.

In particularly preferred developments, at least one heating device that includes a plurality of heating units in particular is provided. The individual heating units of the heating device may be controllable separately in order to hold the temperature steady in a targeted manner. However, in all embodiments, it is preferred that the heating units be controllable by region or in entirety.

Preferably, the heating device is height-adjustable relative to the holding device. It may be possible for the heating device to be located on the base frame or on the holding device. In particular, the heating device is situated in a displaceable manner such that, in a first position, the heating device is situated behind the holding device and, in a second position, it is situated in front of the holding device. As a result, it is possible for the heating device, when in the second position, to not heat up the holding device, but rather, e.g. to heat up the fiber-reinforced layer that was placed on the mould core. It is possible to use the heating device in one position or the other for heating purposes.

In the position in which it is behind the holding device, it is possible, e.g. to heat up a fiber-reinforced layer using the heating device even while the fiber-reinforced layer is being transported and held, while, after the fiber-reinforced layer has been placed onto the mould core, the heating device is moved in front of the holding device in order to heat up the fiber-reinforced layer further and in a targeted manner.

In a preferred development, at least one position sensor and at least one distance sensor are provided on the base frame. In this manner, the position and the distance between the base frame and another device may be sensed. For example, the position and distance from a cutting table or the mould table may be detected and controlled using a position sensor and a distance sensor.

In all embodiments it is preferable for at least one positioning device to be provided in order to position the base frame. The positioning may be carried out manually or automatically. It is possible to use an XYZ-positioning system or a robotic device that is coupled to the base frame and controls the movement of the base frame accordingly. When a robotic device is used, it is possible, e.g. to use an industrial robot.

The method according to the present invention is used to manufacture fiber-reinforced components, and it is carried out using a positionable base frame. A controllable holding device is provided on the positionable base frame, using which one or more fiber-reinforced layers may be gripped and held individually or simultaneously. In the case of the method according to the present invention, after the fiber-reinforced layer is placed on a mould core, it is draped via the application of vacuum and using a draping device which is located on the base frame.

The method according to the present invention also has several advantages; one considerable advantage is that the fiber-reinforced layers may be gripped and draped individually, or severally at the same time. Given that the draping is supported or brought about via the application of vacuum, shaping may be carried out in a particularly flexible manner.

In developments of the present method, individual fiber-reinforced layers or several fiber-reinforced layers are placed on a mould core in successive steps. For this purpose, one fiber-reinforced layer or several fiber-reinforced layers may be gripped simultaneously on a cutting table using grippers which are designed as vacuum grippers in particular, and then transported to a mould table where the fiber-reinforced layers are placed onto the mould core. The vacuum grippers may then be withdrawn, and a stretchable draping layer of a draping device is positioned on the underside of the base frame before the base frame is lowered onto the mould core, thereby resulting in the stretchable draping layer becoming stretched over the mould core.

Via the application of a vacuum in the region of the mould core, the stretchable draping layer becomes suctioned onto the mould core, so that the fiber-reinforced layer becomes draped onto the mould core. If the fiber-reinforced layers contain, e.g. a small portion of a thermoplastic matrix material, the matrix material may be melted via the application of heat, thereby resulting in a stable moulding of the fiber-reinforced layer during the draping process itself.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

An embodiment of the present invention will be explained below with reference to FIGS. 1 through 12.

Figure 1:
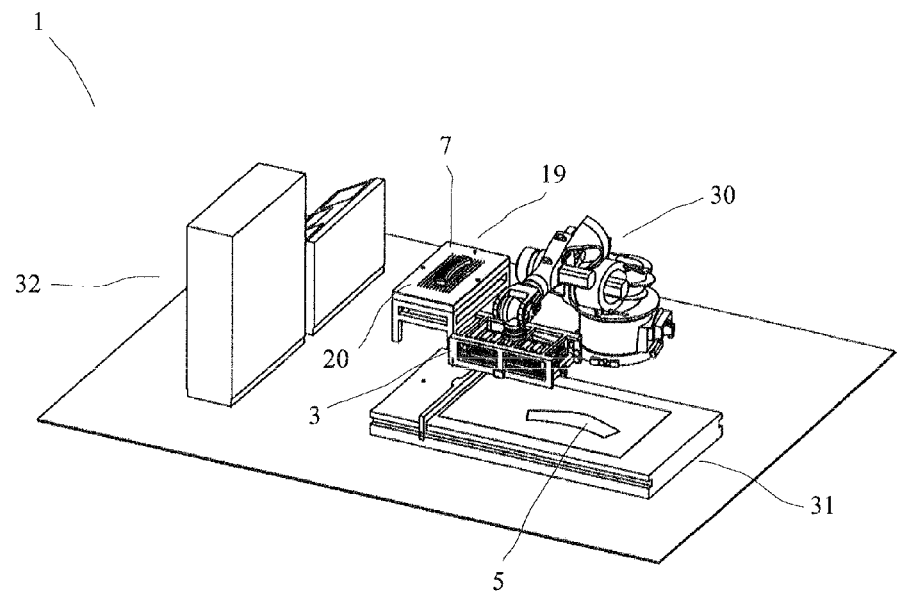
FIG. 1 shows an overall view of a device according to the present invention.

FIG. 1 shows a perspective overall view of a device 1 according to the present invention for use in the manufacture of fiber-reinforced components 2. In a simple embodiment, device 1 according to the present invention is composed only of base frame 3 according to the present invention. In the embodiment described here, device 1 according to the present invention includes further components in addition to base frame 3 according to the present invention.

FIG. 1 shows a cutting table 31 on which the desired blanks of fiber-reinforced layers 5 may be manufactured automatically. For this purpose, fiber-reinforced layer 5 which is present, e.g. as an endless woven fabric mat, may be unwound from a roll and cut using suitable cutting means to obtain the desired shape and size of a fiber-reinforced layer.

Using a positioning device 30 which is designed in particular as a positioning robot, and to which a base frame 3 is coupled, fiber-reinforced layer 5 is suctioned up in a targeted manner and is thereby gripped when base frame 3 is located directly over fiber-reinforced layer 5. To grip the blank, base frame 3 includes a holding device 4 (see FIG. 2) which includes a large number of suction devices 9 which may be activated individually or at least in groups in order to grip the desired shape of a cut-out fiber-reinforced layer 5 in a targeted manner.

After a fiber-reinforced layer 5 is picked up, positioning device 30 moves base frame 3 to a mould table 19 which includes a working surface 20 on which a mould core 7 is located in this case.

Base frame 3 is positioned above mould core 7, and it is lowered onto the mould core, where holding device 4 releases the blank of fiber-reinforced layer 5, thereby placing it onto mould core 7. After this, a second fiber-reinforced layer 5 may be picked up, or fiber-reinforced layer 5 is draped directly onto mould core 7.

A control system 32 on which a control panel may be situated is used to control the process.

Figure 2:
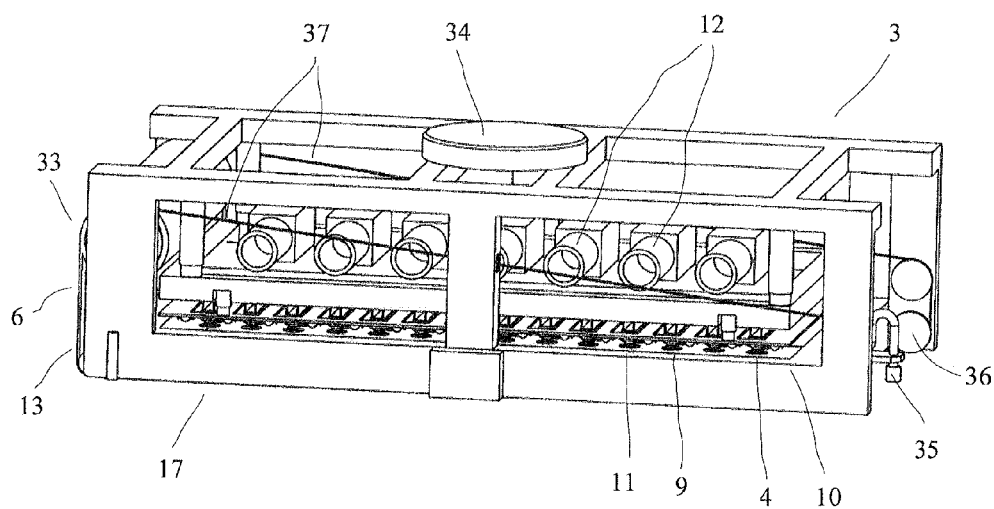
FIG. 2 shows a perspective view of a base frame of the device in FIG. 1.

Base frame 3 which is shown in a slightly perspective view in FIG. 2 includes a connection 34, using which the base frame may be coupled to a positioning device 30 in order to position base frame 3 automatically.

A draping device 6 is provided on base frame 3, which includes a draping layer 13 which, in stationary position shown in FIG. 2, is essentially wound on a roller 33. Draping layer 13 is connected via a draw strip 42 to draw cords 37 and deflection rollers 36 so that, when stretchable draping layer 13 is unwound from roller 33, stretchable draping layer 13 or draping membrane 16 is pulled via draw strip 42 by draw cords 37 onto underside 17 of base frame 3.

In FIG. 2, holding device 4 comprising suction devices 9 and individual flat suction boxes 11 is shown in basic position 10, in which entire holding device 4 is situated within the confines of base frame 3. Individual suction devices 9 are supplied with vacuum via several vacuum pumps 12. Individual vacuum pumps 12 are designed as vacuum pumps 12 which are operated using compressed air, and which generate vacuum via the Bernoulli effect. Vacuum pumps of this type are easy to control, and they generate the vacuum required in proximity in a relatively quiet manner.

A vacuum coupling 35 may also be provided on base frame 3, which transfers the vacuum generated in vacuum pumps 12 to mould table 19 in particular via an appropriate coupling piece, thereby eliminating the need to provide a separate vacuum supply at mould table 19.

Figure 3:
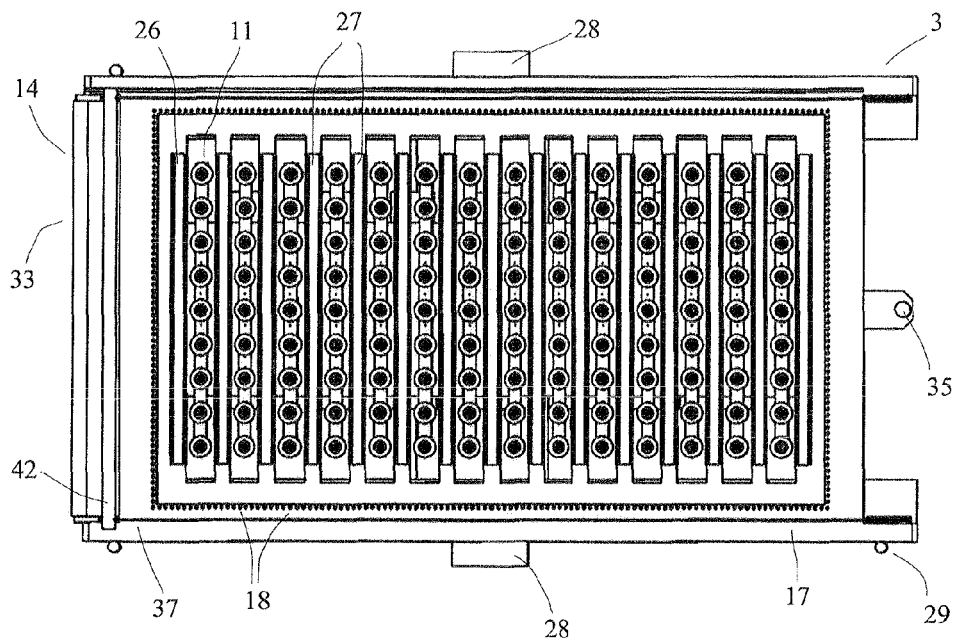
FIG. 3 shows an underside view of the base frame in FIG. 2.
Figure 11:
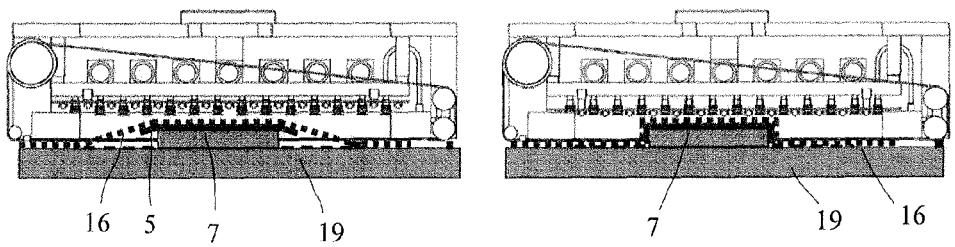
FIG. 11 shows the draping layer being draped onto a mould core.

FIG. 3 shows base frame 3 in an underside view. Holes 18 are formed around the circumference of underside 17 of base frame 3, which may be acted upon with a vacuum in order to suction-up draping layer 13 when draping layer 13 is in working position 15 as shown in FIG. 11 for example. FIG. 3 shows stationary position 14 of draping layer 13, in which draping layer 13 or draping membrane 16 is essentially wound onto roller 33.

Draw strip 42 is shown clearly on the underside of base frame 3; draw strip 42 is situated at the end of draping layer 13 and is connected to circumferential draw cords 37 in order to automatically move draping layer 13 between stationary position 14 and working position 15.

FIG. 3 also shows holding device 4 and heating device 26 which includes heating units 27 that include reflector sheets. In all, heating units 27 are situated such that they are height-adjustable relative to holding device 4 using heating device 26.

Position sensors 28 and distance sensors 29 register the exact position of base frame 3 relative to cutting table 31 and/or mould table 19 so that the position of base frame 3 may be controlled exactly.

Figure 4:
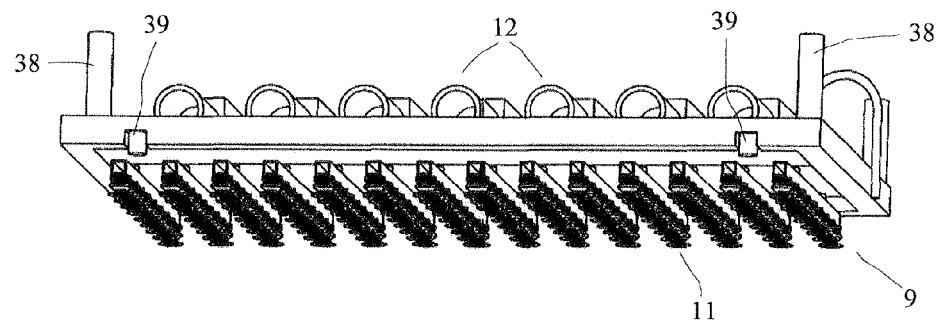
FIG. 4 shows the holding device of the base frame in FIG. 2.

FIG. 4 shows holding device 4 of base frame 3 in FIG. 3, in a perspective view. Flat suction boxes 11 which include suction devices 9, and holding device 4 are situated on base frame 3 via height-adjustable carrier 38. Vacuum pumps 12 are also situated on the holding device, so that they may provide the necessary vacuum at proximity.

Figure 5:
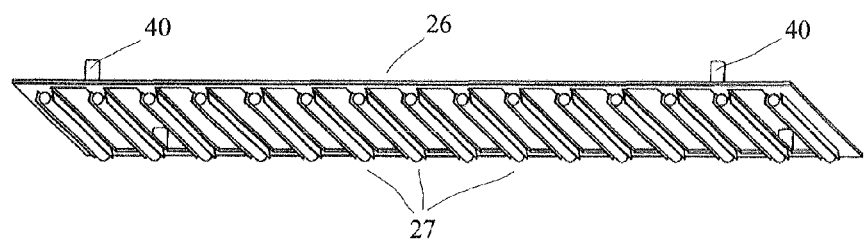
FIG. 5 shows the heating device of the base frame in FIG. 2.

In the embodiment, receptacles 39 for heating device 26 are provided in holding device 4, using which heating device 26 shown in a perspective view in FIG. 5 is accommodated on height-adjustable carrier 40. Via the height-adjustability, it is ensured that heating device 26 is moveable between a first position which is located above holding device 4, and a second position which is located underneath flat suction boxes 11 of holding device 4. As a result, it is possible to prevent damage from occurring to flat suction boxes 11 from the heat output by a heating device when it is located underneath flat suction boxes 11 and heats fiber-reinforced layer 5.

Figure 6:
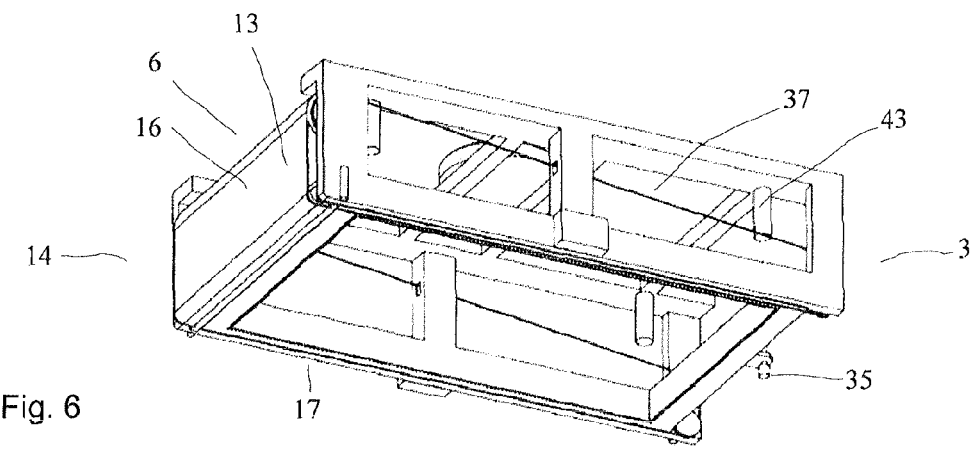
FIG. 6 shows the draping device on a base frame which is depicted schematically.

FIG. 6 is a schematic depiction of base frame 3 on which draping device 6 is located. Draping layer 13 which is designed as draping membrane 16 may be moved from stationary position 14 shown in FIG. 6 to a working position 15, in which draping membrane 16 bears against underside 17 of base frame 3.

Also shown clearly in FIG. 6 are receptacles 43 which enable the height-adjustability of holding device 4.

Figure 7:
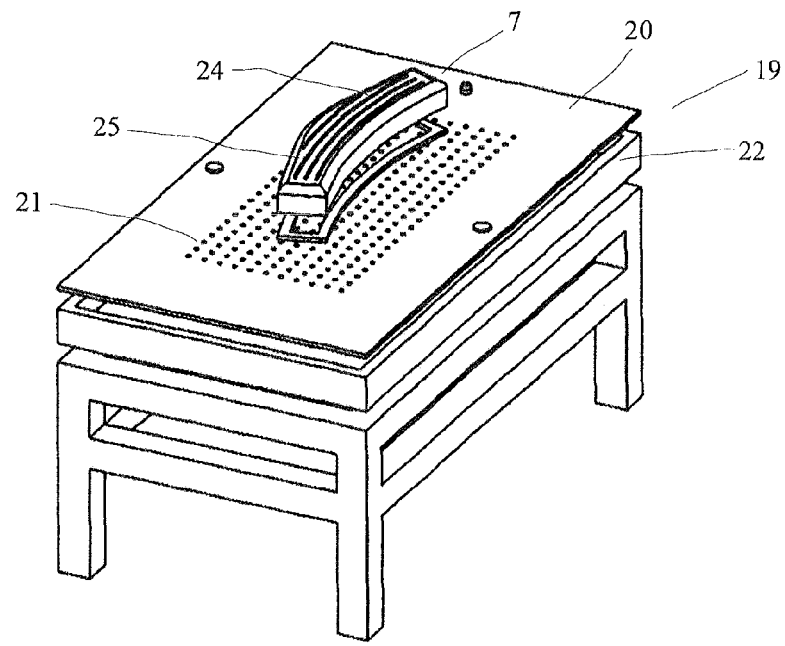
FIG. 7 shows a mould table of the device in FIG. 1 with the components pulled slightly apart from one other.

FIG. 7 shows mould table 19, in which the individual components are depicted as being pulled apart from one another slightly in the vertical direction, in order to provide an overview of the design of mould table 19. Mould table 19 includes a working surface 20 which is provided with a large number of holes 21 in a central region.

A hollow mould core 7 is located on working surface 20, on top side 24 of which slots 25 are provided. Via slots 25 and hollow mould core 7, the vacuum which is applied in evacuation region 22 may be transferred to top side 24 of mould core 7, so that, when a vacuum is applied to evacuation region 22, a fiber-reinforced layer 5 which is situated above mould core 7 is suctioned onto top side 24 of mould core 7.

Mould table 19 may be coupled via a coupling to vacuum coupling 35 of base frame 3 in order to transfer the vacuum that is generated at the base frame using vacuum pumps 12 to evacuation region 22 of mould table 19. In other embodiments, it is also possible for mould table 19 to include a separate vacuum generator or to be supplied with vacuum in another manner.

Figure 8:
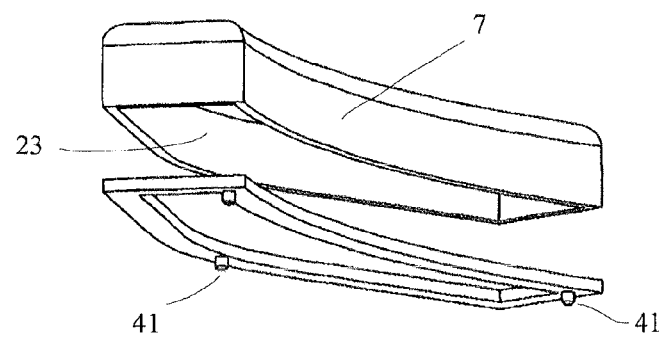
FIG. 8 shows a mould core for manufacturing fiber-reinforced components.

FIG. 8 shows a hollow mould core 7 which is composed of two pieces in this case, and which may be positioned in a defined manner using positioning mandrels 41 in holes 21 on working surface 20 of mould table 19. Using mould core 7 which is hollow in interior 23, and using slots 25 in top side 24, it is possible to transfer a vacuum that is present in evacuation region 22 through mould core 7 to top side 24.

The steps involved in the processing of fiber-reinforced layers is explained below with reference to FIGS. 9 through 12.

Figure 9:
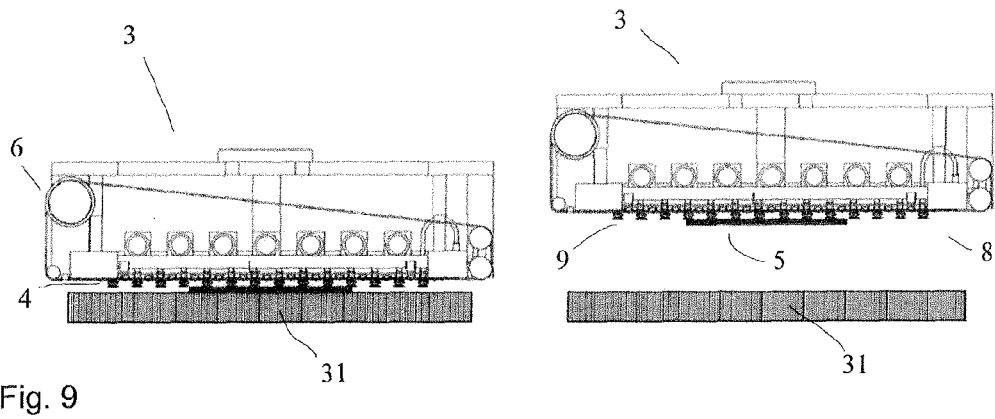
FIG. 9 shows the pick-up and transport of a fiber-reinforced layer using the base frame.

The left half of FIG. 9 shows base frame 3 positioned over a cutting table 31. Draping device 6 is situated in a stationary position 14, while holding device 4 was moved into holding position 8 in order to lift a blank of a fiber-reinforced layer 5 off of cutting table 31. In this case, fiber-reinforced layers 5 are cut to shape automatically in particular.

The right half of FIG. 9 shows how holding device 4 suctions up and holds a blank of a fiber-reinforced layer 5 using vacuum. Base frame 3 has been lifted off of cutting table 31, and it is moved to mould table 19 using a positioning device 30 which is not depicted here.

Figure 10:
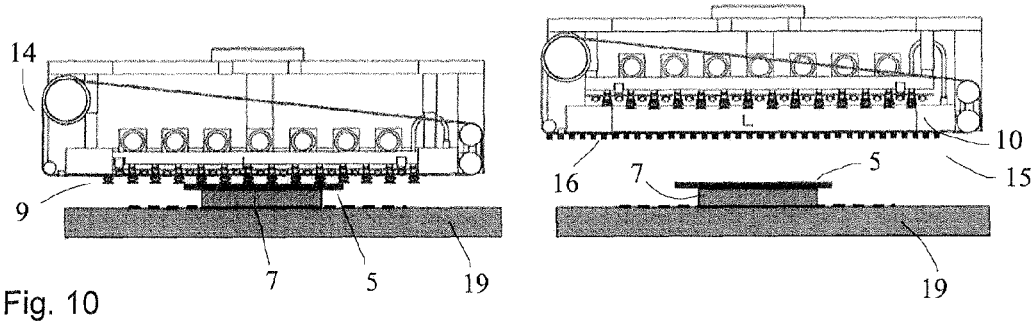
FIG. 10 shows a fiber-reinforced layer being placed on the mould core, and the activation of the draping layer.

The left side of FIG. 10 shows how base frame 3 is lowered onto a mould core 7 of mould table 19, and how fiber-reinforced layer 5 is placed on mould core 7. Draping device 6 is still situated in stationary position 14. After the vacuum is switched off at holding device 4, fiber-reinforced layer 5 is placed on mould core 7, and holding device 4 is transferred from holding position 8 to base position 10.

Next, draping device 6 is moved from stationary position 14 into working position 15 which is shown on the right in FIG. 10. Draping layer 16 was moved to underside 17 of base frame 3, and it bears against underside 17 of base frame 3. By suctioning-up draping layer 16 via vacuum holes 18 provided in the underside of base frame 3, draping layer 16 is held tightly against underside 17 of base frame 3.

Next, base frame 3 is moved into the position shown at the left in FIG. 11, in which base frame 3 was lowered onto mould core 7 and rests on mould table 19. As a result, draping membrane 16 is stretched in the region of mould core 7.

When a vacuum is applied to evacuation region 22 of mould table 19, the vacuum is transferred upwardly through holes 21 in working surface 20 of mould table 19 and through hollow mould core 7, thereby suctioning draping membrane 16 onto mould core 7. Draping membrane 16 causes fiber-reinforced layers 5 to be draped onto mould core 7, as depicted schematically on the right in FIG. 11. To amplify the draping effect, heating device 26 may be activated while draping is taking place.

Figure 12:
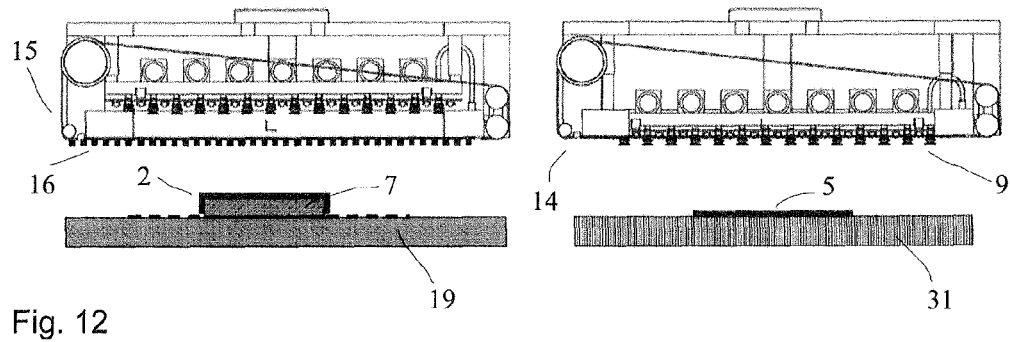
FIG. 12 shows the base frame being lifted off of the mould core, and a return to the starting position above a further fiber-reinforced layer.

After the draping of fiber-reinforced layer 5 has been carried out, base frame 3 may be lifted, as depicted on the left in FIG. 12, and fiber-reinforced layer 5 remains on mould core 7.

As shown on the left in FIG. 12, after base frame 3 has been lifted off of mould table 19, draping membrane 16 may be returned to stationary position 14, and base frame 7 may be moved back to cutting table 31 in order to pick up the next fiber-reinforced layer 5. Depending on the number of fiber-reinforced layers desired, the process described above may be repeated as many times as necessary until the crude part or finished component 2—after resin injection and hardening—may be removed.

In any case, the method described above and the device according to the present invention may be used to manufacture fiber-reinforced components, it being possible to use "dry" reinforcement woven fabric layers or prepregs, in the case of which the reinforcement woven fabric layers are pre-saturated with a resin.

In summary, in the method according to the present invention using dry fibers as fiber-reinforced layers, base frame 3 is initially positioned above a dry-fiber blank on cutting table 31, and it is lowered there, after which the vacuum suction field is switched on in order to grip a reinforcement fiber layer.

Base frame 3 may then be lifted together with the blank which is attached thereto via suction. Heating unit 26 may be switched on directly in order to improve the attachment of the blank at the site where it is deposited. As a result, the processing time may be shortened, since the heating up starts sooner and takes place during transport itself.

After the blank has been transported to the placement site on mould table 19, base frame 3 is positioned over mould core 7 and lowered. Holding device 4 is deactivated, base frame 3 is lifted, and heating device 26 is switched off, it is was activated.

Holding device 4 and heating device 26 are moved into a base position, and draping membrane 16 is moved into place and fixed in position on underside of 17 of base frame 3 via vacuum holes 18.

Base frame 3 with draping membrane 16 fixed in position is then lowered onto mould table 19, thereby stretching draping membrane 16 over mould core 7. Contact pressure may also be applied via base frame 3 in order to prevent draping membrane 16 from slipping.

At the same time, base frame 3 and mould table 19 are coupled via an automatic vacuum coupling, thereby evacuating vacuum region 22 of mould table 19.

Heating device 26 may then be lowered and switched on. Via evacuated vacuum region 22 of mould table 19, the vacuum is transferred to mould core 7, and the entire surface area of draping membrane 16 covers mould core 7.

When draping has ended, heating device 26 is deactivated and raised. The vacuum coupling to mould table 19 is switched off, and base frame 3 is lifted and returned to cutting table 31. These steps are repeated until the desired number of fiber-reinforced layers are situated on the mould core.

The draped component is then removed from the mould core and is transported to a hardening tool. For this purpose, the draped component is placed, e.g. on a first half of hardening tool. Subsequently, a second half may be used to close the tool for a resin injection procedure. The resin injection and consolidation in an oven may then take place before the tool is opened. Finished component 2 may be removed using base frame 3 and transported further.

For a resin-injection procedure, base frame 3 may also be used to pick up auxiliary materials that are required. Auxiliary materials may be, e.g. absorbent nonwovens or tear-off fabric. A vacuum foil may also be picked up automatically from the cutting table or another surface and positioned above the mould core.

It is also possible, after the fiber-reinforced layers have been positioned and draped, to drape the vacuum foil automatically or manually a vacuum being applied to the vacuum foil. Resin infusion and consolidation in an oven may then be carried out before the vacuum generator is removed manually.

It is also possible to process prepregs. A manual working step may also be required, in which a protective foil is removed from the prepreg material. For this purpose, the resin infusion step is eliminated, since the matrix material is contained in the prepreg. Otherwise the processing of prepregs differs from the process of the resin-infusion method described above only in that an autoclave is used instead of an oven to consolidate a prepreg component.

Overall, it is possible using the device according to the present invention and the method according to the present invention to greatly reduce the number of manual steps required to manufacture fiber-reinforced components, thereby resulting in more economical and cost-effective production. At the same time, automation may increase the reproducibility, thereby also increasing quality.

It will be understood that each of the elements described above, or two or more together, may also find a useful application in other types of constructions and method differing from the types described above.

While the invention has been illustrated and described as embodied in a device for use in the manufacture of fiber-reinforced components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A device for manufacturing fiber-reinforced components, comprising
    a positionable base frame that is positioned during manufacturing;

a controllable holding device, which is height-adjustable relative to the base frame to move the holding device relative to the base frame, provided on said positionable base frame and positioned with a positioning of said positionable base frame and is configured for gripping, for holding and for transporting of at least one reinforced fiber layer; and a draping device provided on said positionable base frame and positioned with the positioning of said positionable base frame, wherein the positioning of said positionable base frame comprises transporting said positionable base frame, after said fiber-reinforced layer is gripped and held by said controllable holding device, to a mold table including a working surface upon which a mold core is located, positioning said positionable base frame above said mold core, and lowering said positionable base frame onto said mold core;

wherein said draping device includes a stretchable draping layer that is movable between a stationary position and a working position located on an underside of said positionable base frame for positioning on an outer surface of said fiber-reinforced layer; and wherein said draping device is configured to drape the at least one fiber-reinforced layer to the mold core by lowering the base frame onto said mold core positioned on said mold table so that the stretchable draping layer conforms to the mold core, and via an application of a vacuum in a region of the mold core, the stretchable draping layer becomes suctioned onto the mold core, so that the at least one fiber-reinforced layer becomes draped onto the mold core.

2. The device as defined in claim 1, wherein said controllable holding device extends downwardly past said base frame in a holding position.

3. The device as defined in claim 1, wherein said controllable holding device includes a plurality of devices selected from the group consisting of suction devices, gripping devices, and both which are actuatable separately, at least in groups.

4. The device as defined in claim 1, wherein said holding device includes a plurality of vacuum pumps which are operated using compressed air, and produce a vacuum using the Bernoulli effect.

5. The device as defined in claim 1, wherein the underside of said base frame provided with vacuum holes for fixing the draping layer.

6. The device as defined in claim 1, further comprising said mold table is provided with the working surface over which holes are distributed.

7. The device as defined in claim 6, further comprising an evacuation region provided below said working surface of said mold table and actable upon using a vacuum.

8. The device as defined in claim 7, further a vacuum applied to an interior of said mold core, said mold core having a top side provided with formations selected from the group consisting of holes, slots, and both.

9. The device as defined in claim 8, wherein said mold core is hollow.

10. The device as defined in claim 8, wherein said draping device is lowerable onto said mold core, after which the evacuation region is evacuatable so that said draping layer is drivable over said mold core.

11. The device as defined in claim 1, further comprising at least one heating device including a plurality of heating units.

12. The device defined in claim 11, wherein said heating device is height-adjustable relative to said holding device.

13. The device as defined in claim 1, further comprising at least one positioning sensor and at least one distance sensor provided on said base frame.

14. The device as defined in claim 1, further comprising at least one positioning device for positioning said base frame.

* * * * *